United States Patent [19]

Biggs et al.

[11] 4,381,362

[45] Apr. 26, 1983

[54] FLAME RETARDANT POLYMERIC COMPOSITIONS CAPABLE OF PASSING THE CSA VARNISH TEST

[75] Inventors: James W. Biggs, Lebanon; Melvin F. Maringer, Cincinnati, both of Ohio

[73] Assignee: National Distillers & Chemical Corp., New York, N.Y.

[21] Appl. No.: 295,188

[22] Filed: Aug. 21, 1981

Related U.S. Application Data

[63] Continuation of Ser. No. 185,461, Sep. 9, 1980, abandoned.

[51] Int. Cl.³ ............................................... C08K 5/38
[52] U.S. Cl. .................................... 524/305; 524/264; 524/303

[58] Field of Search ................ 523/212, 213; 524/264, 524/265, 303, 304, 305

[56] References Cited

U.S. PATENT DOCUMENTS 3,245,949 4/1966 Murdock .......................... 260/45.85
3,922,442 11/1975 North ............................... 260/42.15

Primary Examiner—Paul R. Michl
Attorney, Agent, or Firm—Kenneth D. Tremain

[57] ABSTRACT

Crosslinkable ethylene-vinyl acetate copolymer compositions containing silane-treated hydrated inorganic filler are capable of passing the CSA varnish test if an antioxidant composition comprising distearyl-3, 3' thiodiproprionate is admixed therewith.

19 Claims, No Drawings

FLAME RETARDANT POLYMERIC COMPOSITIONS CAPABLE OF PASSING THE CSA VARNISH TEST

This is a continuation of application Ser. No. 185,461, filed Sept. 9, 1980, now abandoned.

BACKGROUND OF THE INVENTION

1. Field of the Invention

This invention relates to crosslinkable polymeric compositions which exhibit moisture and heat resistance and flame resistance and which are useful in producing insulated wire and cable as well as molded products. More particularly, it relates to a crosslinkable ethylene-vinyl acetate copolymer composition capable of passing a test procedure known as the CSA Varnish Test.

2. Description of the Prior Art

One of the most important areas where fire resistant polymer compositions find use is in the electrical environment, i.e., where both insulating and fire resistant properties are sought, most especially in the area of conductor insulation. At one time, extrudable compositions available to the wire and cable art were required, for flame resistance, to contain halogenated polymers such as chlorinated polyethylene, polyvinyl chloride, chlorobutadiene, chlorinated paraffin, etc., together with antimony trioxide, both components being present in sizable quantities. Alternatively, a coating of chlorosulfonated polyethylene paint was applied to a nonflame retardant insulating compound which constituted an additional manufacturing operation.

For certain types of dry transformers, particularly high voltage transformers, a problem existed in that electrical failures occurred due to surface creepage of the organic insulating component used. The problem was solved through the addition of hydrated alumina to compositions whose organic binder consisted of butyl rubber, epoxy resins or polyester resins. However, these compositions do not possess a balance of excellent extrudability characteristics, physical and electrical properties, heat resistance and flame retardance. Such compositions are disclosed in U.S. Pat. Nos. 2,997,526-7 and 8 of Kessel et al. The described compositions for such usage have poor tensile strength, elongation and percent elongation retained after aging.

Fire retarding polymeric compositions exhibiting, inter alia, improved moisture and heat resistance consist essentially of an intimate mixture of at least one crosslinkable polymer containing as a major component an ethylene-vinyl acetate copolymer, one or more silanes and one or more hydrated inorganic fillers have found wide acceptance in the wire and cable art. Such compositions are disclosed in U.S. Pat. Nos. 3,832,326 and 3,922,442 of North et al. These polymeric compositions exhibit a unique combination, or balance, of improved physical and electrical properties together with a high degree of flame and fire retardance. These highly desirable results are achieved without the use of halogenated polymers such as polyvinyl chloride and chlorosulfonated polyethylene, thereby eliminating hydrogen chloride fumes; without carbon black, thereby permitting its use as colored insulations; without any flame retardant coatings such as are currently required, thereby eliminating an additional step in manufacturing operations when the compositions are used as, e.g., insulating compounds extruded onto a conductor; and without antimony trioxide, thereby eliminating a very expensive compound.

Such compositions find particular use as white (an inherent property) and colored uniinsulation compositions, which can be extruded over metal, e.g., copper or aluminum, conductors, to provide a single layer insulating and jacketing composition which is rated according to U.S. standards for 90° C. operation, and in some cases operation at temperatures as high as 125°, at up to 600 volts.

These insulating compositions of North et al. have found particular utility in the insulation of switchboard wire, appliance wire, and automotive wire where a unique combination of superior electrical properties combined with resistance to the degradative effects of heat and flame are essential, and where low smoke density and non-corrosive fumes are desirable.

Besides the three essential components, other additives, such as pigments, stabilizers, lubricants, and antioxidants can be incorporated into the compositions of North et al. Among the antioxidants, polymerized trimethyl dihydro quinoline was found by North et al. to provide effective oxidation inhibition.

In the CSA varnish test, three samples of polymeric insulated wire are (1) heated in an oven, (2) immersed in insulating varnish, (3) reheated in an oven for an extended period, (4) cooled, and (5) bent over a small diameter mandrel. The polymeric composition under test fails if a crack down to the conductor appears in the insulation of any of the three samples when it is bent over the mandrel. Compositions exemplifying the invention of North et al. which employ polymerized trimethyl dihydro quinoline as an antioxidant do not pass the CSA varnish test.

Many polymers are susceptible to oxidation which causes impairment of their physical properties. This degradation may be initiated by heat, light or other energy forms. In most polymers, oxidation proceeds by a free radical chain mechanism. The free radicals form in the polymer under the influence of an internal energy source. These radicals then react with oxygen to form peroxy radical which in turn reacts with the polymer to form a hydroperoxide and another radical which then continues the chain reaction.

Antioxidants have been developed to inhibit polymer degradation. They act either to tie up the peroxy radicals so that these radicals are incapable of propagating the reaction chain, or to decompose the hydroperoxides in such a manner that carbonyl groups and additional free radicals are not formed. The former, called chain-breaking antioxidants, free radical scavengers, or inhibitors, usually are hindered phenols, amines, and the like. The latter, called peroxide decomposers, generally are sulfur compounds (i.e., mercaptans, sulfides, disulfides, sulfoxides, sulfones, thiodipropionic acid esters and the like), or metal complexes of dithiocarbamates and dithiophosphates.

The patent art discloses a number of antioxidants used heretofore with olefinic resins.

U.S. Pat. No. 3,160,680 of Tholstrup et al. and U.S. Pat. No. 3,282,890 of Hagemeyer et al. disclose an antioxidant combination of a sterically hindered phenol and a diester of thiodipropionic acid for use in α-olefin hydrocarbon polymers. U.S. Pat. No. 3,033,814 of Tholstrup teaches the use of a three component antioxidant consisting of a hindered phenol, a diester of thiopropionic acid and phenyl salicylate in a polymer of a $C_2$–$C_{10}$ alpha olefin hydrocarbon. U.S. Pat. No.

3,181,971 of Rayner employs the combination of a phenolic antioxidant and a primary or secondary aromatic or aliphatic amino compound with propylene homopolymers or copolymers of propylene with other hydrocarbons. U.S. Pat. No. 3,242,135 of Bown et al. combines an ester of boric acid with a hindered phenol and a diester of thiodipropionic acid to provide oxidation inhibition for homopolymers and copolymers of $C_2$–$C_8$ alpha olefin hydrocarbons. U.S. Pat. No. 3,245,949 of Murdock is directed to homo and copolymers of $C_2$–$C_8$ aliphatic olefin hydrocarbons and mixtures thereof employing as an antioxidant the combination of a phosphorous-containing polyphenolic compound and the dilauryl or distearyl ester of dithiopropionic acid. None of these patents discloses or suggests that the antioxidant combinations can be usefully incorporated in other than hydrocarbon polymers, i.e., no use is suggested with a polymer containing a major amount of an ethylene-vinyl acetate copolymer.

It is an object of this invention to provide a crosslinkable ethylene-vinyl acetate copolymer composition capable of passing the CSA varnish test.

It is another object of this invention to provide an ethylene-vinyl acetate copolymer composition containing silane-treated hydrated inorganic filler which not only exhibits superior moisture and heat resistance and flame retardance but also successfully passes the CSA varnish test.

All percentages and parts expressed in the specification and claims are by weight, unless specifically indicated otherwise.

SUMMARY OF THE INVENTION

In accordance with the present invention, it has been found that if an antioxidant comprising a diester of thiodipropionic acid is substituted for the polymerized trimethyl dihydro quinoline antioxidant in the ethylene-vinyl acetate (EVA) compositions of North et al., the resulting compositions not only exhibit substantially the same moisture and heat resistance, flame retardance and oxidation inhibition as they formerly did but they unexpectedly pass the CSA varnish test. More particularly, this invention is directed to a crosslinkable polymeric composition capable of passing the CSA varnish test which comprises:

(a) a polymeric component containing at least 66% by weight of a copolymer of ethylene and a vinyl ester of a $C_2$–$C_6$ aliphatic carboxylic acid, a $C_1$–$C_6$ alkyl acrylate or a $C_1$–$C_6$ alkyl methacrylate, (b) from 80 to 400 parts of hydrated inorganic filler per 100 parts of the polymer component, (c) 0.5 to 5 parts of an alkoxy silane per 100 parts of hydrated inorganic filler, and (d) an amount effective to enable said polymeric composition to pass the CSA varnish test of an antioxidant composition comprising at least 25% distearyl-3,3'-thiodipropionate.

This invention is also described as directed to a crosslinkable polymeric composition capable of passing the CSA varnish test which comprises:

(a) a polymeric component containing at least 66% by weight of a copolymer of ethylene and a vinyl ester of a $C_2$–$C_6$ aliphatic carboxylic acid, a $C_1$–$C_6$ alkyl acrylate or a $C_1$–$C_6$ alkyl methacrylate, (b) from 80 to 400 parts of hydrated inorganic filler per 100 parts of the polymer component, (c) 0.5 to 5 parts of an alkoxy silane per 100 parts of hydrated inorganic filler, and (d) 0.1 to 5 parts of distearyl-3,3'-thiodipropionate per 100 parts of the polymeric component.

The present invention is also concerned with the improvement in a crosslinkable polymeric composition of the type comprising:

(a) a polymeric component containing at least 66% by weight of a copolymer of ethylene and a vinyl ester of a $C_2$–$C_6$ aliphatic carboxylic acid, a $C_1$–$C_6$ alkyl acrylate or a $C_1$–$C_6$ alkyl methacrylate, (b) from 80 to 400 parts of hydrated inorganic filler per 100 parts of the polymer component, and (c) 0.5 to 5 parts of an alkoxy silane per 100 parts of hydrated inorganic filler, which comprises admixing with said polymeric composition an amount effective to enable said polymeric composition to pass the CSA varnish test of an antioxidant composition comprising at least 25% distearyl-3,3'-thiodipropionate.

Again this invention relates to an electrical conductor coated with a uniinsulating layer comprising any of the crosslinkable polymeric compositions described hereinabove which are capable of passing the CSA varnish test.

DESCRIPTION OF THE PREFERRED EMBODIMENTS

The present invention relates to crosslinkable polymeric compositions comprising copolymers of ethylene and a vinyl ester of an aliphatic carboxylic acid, an alkyl acrylate or an alkyl methacrylate and a silane-treated hydrated inorganic filler which will pass the CSA varnish test. These compositions find particular utility as wire and cable insulation.

The compositions of this invention contain, in addition to a particular antioxidant composition, one or more crosslinkable or curable ethylene copolymers, one or more silanes and one or more hydrated inorganic fillers. The copolymers, silanes and inorganic fillers include those disclosed in U.S. Pat. No. 3,832,326 and 3,922,442 of North et al., the disclosures of which are incorporated herein by reference.

THE CROSSLINKABLE COPOLYMER COMPONENTS

The terms crosslinkable or crosslinking are ascribed their normal art recognized meaning in the present specification, i.e., they denote the formation of primary valence bonds between polymer molecules.

Crosslinking can be accomplished by any of the known procedures such as chemical means including peroxide crosslinking; by radiation using cobalt-60, accelerators, $\beta$-rays, $\gamma$-rays, electrons, X-rays, etc.; or by thermal crosslinking. The basic procedures for crosslinking polymers are extremely well known to the art and need not be described here in detail.

The polymeric component of the present composition is a copolymer of ethylene and a comonomer which may be a vinyl ester, an acrylate or a methacrylate. The vinyl ester may be a vinyl ester of a $C_2$–$C_6$ aliphatic carboxylic acid, such as vinyl acetate, vinyl propionate, vinyl butyrate, vinyl pentanoate or vinyl hexanoate. The acrylates and methacrylates may be any of the $C_1$–$C_6$ alkyl esters including, for example, methyl, ethyl, propyl, butyl, pentyl or hexyl acrylate or methacrylate. The preferred copolymer comprising the polymeric component of this invention is an ethylene-vinyl acetate copolymer containing about 9 to about 90%, preferably about 9 to about 40%, most preferably about 9 to about 28%, vinyl acetate, balance ethylene.

Although little is gained, and some properties are even harmed, it is possible to include minor proportions of other crosslinkable polymers or copolymers in the composition of this invention. However, ethylene copolymers, preferably, ethylene-vinyl acetate copolymers, as described above, should comprise at least about 66% of the total polymers present. Representative of such minor polymeric components which can be used in such non-preferred embodiments include polyethylene, copolymers of ethylene with propylene, butene, the acrylates and maleates, polydimethyl siloxane and polymethylphenylsiloxane, copolymers of vinyl acetate with the acrylates, etc. Obviously, mixtures of these minor polymeric components can be used.

Terpolymers of ethylene and vinyl acetate derived from, e.g., any of the corresponding monomeric materials listed above (other than ethylene or vinyl acetate) can be used. A representative terpolymer would be an ethylene-vinyl acetate-vinyl maleate terpolymer.

The ethylene-vinyl acetate copolymer used in our invention preferably have a melt index of from about 1.0 to about 20.0.

The polyethylenes useful in the present invention include essentially all high, medium and low density polyethylenes as well as mixtures thereof. The most preferred polyethylenes for blending for use as uniinsulation for electrical wires and cables generally have a density of from about 0.900 to about 0.950 gm./cc. and a melt index of from about 1.0 to about 10.0.

More specifically, the compositions of the present invention provide a superior and unexpected balance of:

1. low temperature brittleness, i.e., the composition will not readily crack during low temperature movement (ASTM D 746).
2. heat resistance after aging, i.e., excellent elongation after extended service at 90° C. and even 125° C.
3. arcing and tracking resistance, as high as 5 KV, whereas even porcelain shows surface breakdown at 4 KV. This property is not often required, however, in the preferred environment of under 600 volt service.
4. flame resistant and flame retardance.
5. moisture resistance, i.e., low mechanical absorption of water which yields a superior dielectric constant.
6. resistance to industrial chemicals.

It is not known why the compositions of this invention provide such a superior balance of properties. It is possible that there is some synergistic relationship between the ethylene-vinyl acetate copolymer, silane and hydrated inorganic filler, but there is no intention to be bound by such a theory. However, it has been established that for low voltage environments, less than 5000 volts, even more particularly for less than 600 volt environments, the compositions of this invention are particularly useful for service as uniinsulation. Uniinsulation is an art accepted term denoting insulation where one layer is extruded around the conductor, and this one layer serves as the electrical insulation and the jacketing to provide physical and flame protection. The present compositions are especially adapted for service as uniinsulation in the under 5000 volt, most especially in the under 600 volt range, where only a single extruded coating is used, and it is in the environment that a superior balance of proporties is required. It has been further found that ethylene-vinyl acetate copolymers will hold very large amounts of filler and still provide high flexibility and a high degree of crosslinking. The simultaneous achievement of high filler loading, flexibility and crosslinking is quite surprising as high flexibility and high crosslinking were generally believed incompatible, as are high crosslinking and high filler loading (which implies low crosslinkable polymer content). Ethylene-vinyl acetate copolymers further provide superior fire retardance to the polymeric compositions of the present invention.

The above described ethylene-vinyl acetate copolymers may be crosslinked by irradiation with high-energy electron beams or through the use of chemical crosslinking additives. Fully crosslinked, these polymers become thermoset in behavior. In the preferred compositions of this invention, chemical crosslinking is preferred, particularly where superior physical strength is required.

Chemical crosslinking is accomplished by incorporating a crosslinking agent, e.g., dicumyl peroxide or alpha, alpha' bis(t-butylperoxy) diisopropylbenzene, into the ethylene-vinyl acetate copolymer. The peroxide is later activated during processing to link the ethylene-vinyl acetate polymer chains into a three-dimensional network (and other minor amounts of crosslinkable polymer, if present).

The chemical crosslinking is carried out in accordance with procedures well known to the art, and variations in the general cross-linking conditions set out below will be apparent to one skilled in the art. The present invention is moreover, not limited to the use of tertiary organic peroxides for chemical crosslinking, and other art recognized materials which decompose to provide free radicals can be used. Obviously such crosslinking agents should not decompose during compounding of the composition, but the selection of acceptable cross-linking agents will be apparent to those skilled in the art.

Generally speaking, as the amount of crosslinking agent used increases, the degree of polymer crosslinking increases. Usually no more than 10% (based on polymer) of the organic tertiary peroxides need be used, with 3 to 6% being more typical values. Other crosslinking agents may require different amounts, but these can be readily determined. It is often advisable to avoid very low amounts of crosslinking agents, since some loss of resistance to deformation under sudden or continuous pressure may ensue. Crosslinking coagents such as triallylcyanurate and the like may also be included to increase the effectiveness of the crosslinking agent.

The tertiary organic peroxides, as with most other chemical crosslinking agents, are activated by heating to above their activation temperature whereupon decomposition thereof occurs. Any of the known procedures can be used to accomplish activation, e.g., high pressure steam application to the composition.

The art of radiation crosslinking is so highly developed that little need be said with respect to such procedures. As higher total doses of radiation are used, the degree of crosslinking generally increases, and for preferred crosslinkings a total radiation dose of about 5–25 megarads will be used.

Crosslinking is generally conducted at superatmospheric pressures, e.g., on the order of 200 to 400 psi, although higher or lower pressures may be used. Pressure is employed to avoid uncontrolled porosity in the polymer, which would be highly undesirable in electrical insulation.

In general, the higher the degree of crosslinking the more resistant the polymeric composition is to moisture, chemical reagents, etc., and the less resistant the polymeric composition is to abrasion. At lower degrees of crosslinking there is also some loss of heat resistance as well as pronounced effect on percent elongation after aging. The exact degree of crosslinking can, of course, be varied to take the above factors and their effect on the final product into account. Although higher or lower values can be used, for wire and cable insulation a crosslinking percentage on the order of about 95% for ethylene-vinyl acetate is generally preferred, determined by extraction weight of soluble components in the crosslinked polymer.

THE SILANE COMPONENT

One or more substituted silanes comprise the second essential component of the polymeric compositions of the present invention.

Any silane may be used in the present invention which will not adversely affect the desired balance of properties and which will help to bind the polymer and inorganic filler of the present invention, provided that the silane is not combustible, e.g., alkoxy and amine silanes, and does not interfere with polymer crosslinking or degrade during polymer processing.

The preferred silanes used in forming the insulating compositions are the alkoxy silanes, e.g., lower alkyl-, alkenyl-, alkynl- and aryl-alkoxysilanes as well as the lower alkyl-, alkenyl-, alkynyl- and aryl-alkoxyalkoxy or -aryloxyalkoxy silanes. Specific examples of such silanes are methyltriethoxy-, methyltris (2 methoxyethoxy)-, dimethyldiethoxy-, alkyltrimethoxy-, vinyltris (2-methoxyethoxy)-, phenyl-tris (2-methoxyethoxy), vinyltrimethoxy- and vinyltriethoxy-silane.

It is preferred to use the vinyl silanes for best results, and of the vinyl silanes the following are especially preferred:

gamma-Methacryloxypropyltrimethoxy-Silane

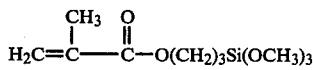

and

Vinyl-Tris (2-Methoxyethoxy) Silane
H$_2$C=CHSi (OCH$_2$CH$_2$OCH$_3$)$_3$

THE HYDRATED INORGANIC FILLER COMPONENT

The fillers used in the present invention are the hydrated inorganic fillers, e.g., hydrated aluminum oxides (Al$_2$O$_3$.3H$_2$O or Al(OH)$_3$), hydrated magnesia, hydrated calcium silicate. Of these compounds, the most preferred is hydrated aluminum oxide.

To obtain the superior balance of properties described, it is mandatory that a hydrated inorganic filler be used in formulating the polymeric compositions. It must be emphasized that large proportions of another type of filler, be it inert or not, cannot be added to the compositions and still achieve the superior balance of properties.

The water of hydration in the inorganic filler must be released during the application of heat sufficient to cause combustion or ignition of the ethylene-vinyl acetate copolymer. The water of hydration chemically bound to the inorganic filler is released endothermically. It has been found that the hydrated inorganic filler increased flame retardance in a manner far superior to other fillers previously used by the art to provide insulation with flame retardance, e.g., carbon black, clays, titanium dioxide, etc. What is even more surprising is that flame retardance is combined with excellent electrical insulation properties at the high filler loadings used, since at these loadings the copolymeric composition contains a large amount of bound water.

The filler size should be in accordance with those sizes used by the prior art.

THE ANTIOXIDANT COMPONENT

An antioxidant composition comprises the fourth component of the polymeric compositions of the present invention and is the component which unexpectedly results in these compositions passing the CSA varnish test. A diester of thiodipropionic acid constitutes an essential ingredient of this antioxidant. The preferred diester is distearyl-3,3'thiodipropionate (DSTDP). Although this material is a known antioxidant which functions as a peroxide decomposer, its action in enabling the compositions of this invention to pass the CSA varnish test is not entirely understood. The action of this particular diester is all the more surprising since a related diester, dilauryl-3,3' thiodipropionate (DLTDP), although often used interchangeably with or in combination with DSTDP in an antioxidant application, will not produce a polymeric composition capable of passing the CSA varnish test when it is substituted for DSTDP in the compositions of the present invention.

In addition to DSTDP which constitutes an essential component of the antioxidant composition, other antioxidants may be used in combination therewith. It has been found that the use of two different types of antioxidants provides effective oxidation inhibition. Thus, a mixture of an antioxidant of the chain breaking type and one which is a peroxide decomposer provides a very effective antioxidants composition. Therefore, with DSTDP, which is a known peroxide decomposer, an amine or a hindered phenol may be effectively employed as an antioxidant composition. Among these fr radical scavengers, the stearically hindered phenols are especially effective. Useful phenols include the alkylated phenols, the alkylidene-bis-alkylated phenols and the polyphenols. Specific examples thereof include 2,6 ditertiary butyl-para-cresol, octadecyl 3,5-di-t-butyl-4-hydroxyhydrocinnamate, 2,2'-methylene bis(6-t-butyl-4-methyl phenol), 4,4'-butylidene bis (6-t-butyl-3 methyl phenol), 1,3,5-trimethyl-2,4,6-tris (3,5-di-t-butyl-4-hydroxybenzyl) benzene and tetrakis (methylene (3,5-di-t-butyl-4-hydroxyhydrocinnamate)) methane with the latter being particularly preferred.

THE CSA VARNISH TEST

This test developed by the Canadian Standards Association evaluates the insulation of coil-lead wires (Clause 6.7 of CSA Standard C22.2 No. 116) and electrical wires and cables (Clause 4.25 of CSA Standard C22.2 No. 0.3). The tests applied to coil-lead wires and electrical wires and cables are essentially the same. Specimens of insulated wire are heated in an air oven at 104°–106° C. for ½ hour, following which they are removed from the oven and immediately immersed in insulating varnish for one hour at room temperature. Upon removal from the varnish the specimen is suspended at room temperature for one hour and then placed in an oven for 20 hours at either 149°–151°,

TABLE I

CSA Varnish Test Results

| | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| Antioxidants | | | | | | | | | | | | | | | | | |
| Agerite MA (2), phr | 2 | 2 | — | — | — | — | — | — | — | — | 2 | 2 | 2 | — | — | — | — |
| Irganox 1010 (3), phr | — | — | 2 | 2 | 2 | 2 | — | — | — | — | — | — | — | 2 | 2 | 2 | 2 |
| DSTDP (4), phr | — | — | 1 | 1 | — | — | 1 | 1 | — | — | 1 | — | — | 1 | — | 1 | — |
| DLTDP (5), phr | — | — | — | — | — | — | — | — | — | — | — | 1 | — | — | 1 | — | 1 |
| Lubricants | | | | | | | | | | | | | | | | | |
| Calcium Stearate, phr | 2 | — | 2 | — | 2 | — | 2 | — | 2 | — | — | — | — | — | — | — | — |
| Mold Wiz Int 33 UDK (6), phr | — | 1 | — | 1 | — | 1 | — | 1 | — | 1 | 1 | 1 | 1 | 1 | 1 | 1 | 1 |
| CSA Varnish Test (7) | | | | | | | | | | | | | | | | | |
| Pass/Fail | Fail | Pass | Pass | Pass | Fail | Pass | Pass | Pass | Fail | Pass | Fail | Fail | Fail | Pass | Fail | Pass | Pass |
| Crack to Conductor | I | | | | I | | | | I,I | | I,I | I,I | I | | I | | |
| Crack not to Conductor | I,I | I,I,I | I,vs | S,vs,S | I,I | I,vs | | S | I | I,S,I | I | I | I,I | S,S,S | I,I | | I,I,I |
| No Cracking | | x | | | | | x,x,x | x,x | | | | | | | | x,x,x | |

Notes
(2) Polymerized 1,2 dihydro-2,2,4-trimethyl quinoline
(3) Tetrakis (methylene (3,5-di-t-butyl-4-hydroxy-hydrocinnamate)) methane
(4) Distearyl-3,3'-thiodipropionate
(5) Dilauryl-3,3'-thiodipropionate
(6) 25% lauric acid, 75% ethylene-bis-stearamide
(7) CSA Varnish Test - 3 specimens - Fail if one specimen has crack in insulation to conductor
I—Deep crack in insulation
S—Slight but visible crack in insulation
VS—Slight crack in insulation requires some magnification to see Sample No. 1 is an exemplification of the compositions of U.S. Pat. Nos. 3,832,326 and 3,922,442 of North et al. This sample did not pass the CSA varnish test; six other samples also failed the test. Of the seven samples containing DSTDP, six passed the test (Samples 3, 4, 7, 8, 14 and 16). Of the 18 specimens comprising these six DSTDP samples, *only one* specimen showed a deep crack in the insulation. Each of the fifteen specimens of the samples containing the polymerized quinoline antioxidant exhibited deep cracks (Samples 1, 2, 11, 12 and 13) as did all nine specimens of the samples containing the DLTDP antioxidant (Samples 12, 15 and 17). It may also be significant that the only DSTDP sample (Sample 11) which failed the test also contained the polymerized quinoline antioxidant and all three specimens showed deep cracks.

These tests show that DSTDP was not effective with the polymerized quinoline antioxidant. Further, DLTDP cannot be substituted for DSTDP where passing the CSA varnish test is a requirement.

From these tests, it appears that, of those additives evaluated, DSTDP is the most significant contributor to passing the CSA varnish test. Further, the best antioxidant combination was DSTDP plus the hydrocinnamate, while the most effective system contained this antioxidant system plus the Mold Wiz lubricant. Samples of this latter system (Samples 4, 14 and 16) showed only slight cracks, if any.

What is claimed is:

1. A crosslinkable polymeric composition capable of passing the CSA varnish test which comprises:
   (a) a polymeric component containing at least 66% by weight of a copolymer of ethylene and a vinyl ester of a $C_2$–$C_6$ aliphatic carboxylic acid, a $C_1$–$C_6$ alkyl acrylate or a $C_1$–$C_6$ alkyl methacrylate,
   (b) from 80 to 400 parts of hydrated inorganic filler per 100 parts of the polymer component,
   (c) 0.5 to 5 parts of an alkoxy silane per 100 parts of hydrated inorganic filler, and
   (d) an amount effective to enable said polymeric composition to pass the CSA varnish test of an antioxidant composition comprising at least 25% distearyl-3,3'-thiodipropionate.

2. A composition according to claim 1 wherein the copolymer is an ethylene-vinyl acetate copolymer.

3. A composition according to claim 1 wherein the antioxidant composition of component (d) additionally comprises a sterically hindered phenol.

4. A composition according to claim 3 wherein the phenol is tetrakis (methylene (3,5-di-tertiary-butyl-4-hydroxy-hydrocinnamate)methane.

5. A composition according to claim 1 containing in addition a lubricating effective amount of a lubricant comprising lauric acid and ethylene-bis-stearamide.

6. A composition according to claim 4 containing in addition a lubricating effective amount of a lubricant comprising lauric acid and ethylene-bis-stearamide.

7. A crosslinkable polymeric composition capable of passing the CSA varnish test which comprises:
   (a) a polymeric component containing at least 66% by weight of a copolymer of ethylene and a vinyl ester of a $C_2$–$C_6$ aliphatic carboxylic acid, a $C_1$–$C_6$ alkyl acrylate or a $C_1$–$C_6$ alkyl methacrylate,
   (b) from 80 to 400 parts of hydrated inorganic filler per 100 parts of the polymer component,
   (c) 0.5 to 5 parts of an alkoxy silane per 100 parts of hydrated inorganic filler, and
   (d) 0.1 to 5 parts of distearyl-3,3'thiodipropionate per 100 parts of the polymeric component.

8. A composition according to claim 7 wherein the copolymer is an ethylene-vinyl acetate copolymer.

9. A composition according to claim 7 containing in addition:
   (e) 0.1 to 5 parts of a sterically hindered phenol per 100 parts of the polymeric component.

10. A composition according to claim 9 wherein the phenol is tetrakis (methylene (3,5-di-tertiary butyl-4-hydroxy-hydrocinnamate)) methane.

11. A composition according to claim 7 containing in addition:
    (f) 0.1 to 5 parts of a lubricant comprising lauric acid and ethylene-bis-stearamide.

12. A composition according to claim 10 containing in addition:
    (f) 0.1 to 5 parts of a lubricant comprising lauric acid and ethylene-bis-stearamide.

159°–161° or 203°–205° C. depending on the type of wire. Following the cooling of each specimen at room temperature for 2 hours, it is bent once around a small-diameter mandrel. An insulated wire fails this test if the insulation on any one of three specimens of the wire under test cracks through to the conductor.

The compositions of this invention unexpectedly pass this stringent test whereas the prior art compositions exemplified by North et al. although possessing properties which make them useful as superior flame retardant wire and cable insulation are unable to pass the CSA varnish test. Not only do the compositions of this invention pass the CSA varnish test they also exhibit the excellent fire retardance and moisture and heat resistance of the North et al. polymeric compositions.

THE PROPORTION OF THE COMPONENTS

The amounts of the polymer and filler in the composition of this invention can be varied within wide proportions. However, the silane percentage should be in the range of from about 0.5 to 5.0 parts per 100 parts of filler. Lower amounts may be insufficient to provide adequate surface treatment while larger quantities could have an adverse effect on some of the physical properties, i.e., elongation, of an extruded insulating compound after crosslinking.

Best results are obtained in coating, e.g., extruding, onto electrical wires and cables when from 80 to 400 or more weight parts of filler (most preferable at least 125–150 weight parts), 0.5 to 5.0 weight parts of silane and 100 weight parts of polymer are present.

The antioxidant composition must be provided in a amount which will provide effective oxidation inhibition while also providing sufficient DSTDP to permit the polymeric composition to pass the CSA varnish test. Where DSTDP is the only component of the antioxidant composition, passing the CSA varnish test constitutes no particular problems. When other antioxidants are combined with the DSTDP, the DSTDP should constitute at least 25% of the antioxidant composition. The antioxidant composition in terms of a specific amount should be in the range of 0.5 to 5.0, preferably 1.0 to 3.0, parts per 100 parts of polymer.

The compositions of the present invention may be formed in a number of ways. However, in every instance it is necessary that the filler and silane be intimately contacted. For instance, the preferred method of filler treatment is by direct addition of the silane to the polymer followed by addition thereto of the filler, the antioxidant composition, and other additives, if desired. This can be done in an internal mixer, such as a Banbury or Werner & Pfleiderer mixer. Alternatively, the silane may be added directly to the filler, dispersed therein, and the polymer and the anti-oxidant composition then added.

Any processing device known to the art which insures an intimate mixture of the essential components may be used, provided the silane is intimately and thoroughly dispersed onto the surface of the hydrated inorganic filler.

It will be apparent that in addition to the essential components of the compositions of this invention, other additives may be present, e.g., pigments, stabilizers, so long as they do not interfere with crosslinking, when desired, or harm desired properties. Such materials are present in very minor proportions, ranging from less than 10% of the polymer, and usually in amounts of less than 5%. There are two reasons amounts of other components are not desirable: firstly, the present composition per se has such superior properties; secondly, any significant amounts of other fillers for example, serve only to degrade or upset the balance or properties.

For the formation of insulation on conductors by extrusion, the most preferred embodiment of this invention, another component is generally necessary, i.e., a lubricant such as a fatty acid soap or metallic derivative thereof. Such a material is also important to improve the stripping properties of wire insulation and thereby to permit the insulation to be easily stripped from the wire by the user to facilitate splicing and to make terminations. It is necessary to avoid, however, soaps which interfere with the crosslinking reaction (free radical mechanism) such as zinc stearate, which will react with organic peroxides. Acceptable soaps are the alkaline earth metal fatty acid soaps. A preferred soap is calcium stearate. Additional representative examples of useful lubricants include the alkaline earth metal salts and aluminum salts of stearic acid, oleic acid, palmitic acid and other fatty acids used by the art for this purpose, silicone oil, long chain aliphatic amides, waxes, etc. One particularly preferred lubricant is a mixture of 15–35% lauric acid and 85–65% ethylene-bis-stearamide.

The following example is provided to further illustrate certain aspects of the invention.

A number of crosslinkable EVA copolymer compositions were prepared and subjected to the CSA varnish test. Each of the samples contained the same copolymer, hydrated alumina, silane and crosslinking agent in the same proportions, viz:

|  | Amount, phr[1] |
|---|---|
| Ethylene-vinyl acetate copolymer (17% Vinyl Acetate; Melt Index 1.5) | 100 |
| Hydrated Alumina | 125 |
| Silane (vinyl-tris (2-methoxyethoxy) silane) | 2 |
| Crosslinking agent ($\alpha, \alpha'$; bis (t-butylperoxy) diisopropylbenzene) | 4.25 |

[1]phr = pounds per 100 pounds of resin

Seventeen samples were prepared, each of which contained, in addition to the above components, a one or two component antioxidant composition, and a lubricant. Four commercially available antioxidants were evaluated including two diesters of thiopropionic acid which are often used interchangeably in the art because of their very similar antioxidant properties. The other two antioxidants were amine and phenol-type antioxidants. The two lubricants evaluated were also commercially available products.

The silane, the filler and the other components were added to the polymer and blended therewith. Care was taken to control the temperature rise during the mixing so as to not activate the peroxide prior to the completion of blending. Following mixing, the polymer composition was extruded onto a copper wire using a Brabender extruder and raised to the peroxide activation temperature by vulcanization in steam under high pressure.

The compositions of these samples and the results of the CSA varnish test are presented in Table I below.

13. In a crosslinkable polymeric composition of the type comprising:
(a) a polymeric component containing at least 66% by weight of a copolymer of ethylene and a vinyl ester of a $C_2$-$C_6$ aliphatic carboxylic acid, a $C_1$-$C_6$ alkyl acrylate or a $C_1$-$C_6$ alkyl methacrylate,
(b) from 80 to 400 parts of hydrated inorganic filler per 100 parts of the polymer component, and
(c) 0.5 to 5 parts of an alkoxy silane per 100 parts of hydrated inorganic filler the improvement which comprises admixing with said polymeric composition an amount effective to enable said polymeric composition to pass the CSA varnish test of an antioxidant composition comprising at least 25% distearyl-3,3'-thiodipropionate.

14. The improvement according to claim 13 wherein the copolymer is an ethylene-vinyl acetate copolymer.

15. The improvement according to claim 13 wherein the antioxidant composition additionally comprises a sterically hindered phenol.

16. The improvement according to claim 15 wherein the phenol is tetrakis (methylene (3,5-di-tertiary-butyl-4-hydroxy-hydrocinnamate))methane.

17. The improvement according to claim 13 containing in addition a lubricating effective amount of a lubricant comprising lauric acid and ethylene-bis-stearamide.

18. The improvement according to claim 16 containing in addition a lubricating effective amount of a lubricant comprising lauric acid and ethylene-bis-stearamide.

19. An electrical conductor coated with an uninsulating layer comprising the crosslinkable polymeric composition of claim 1, 2, 3, 5, 7, 8, 9, 11, 13, 14, 15 or 17.

* * * * *